United States Patent Office 3,110,179
Patented Nov. 12, 1963

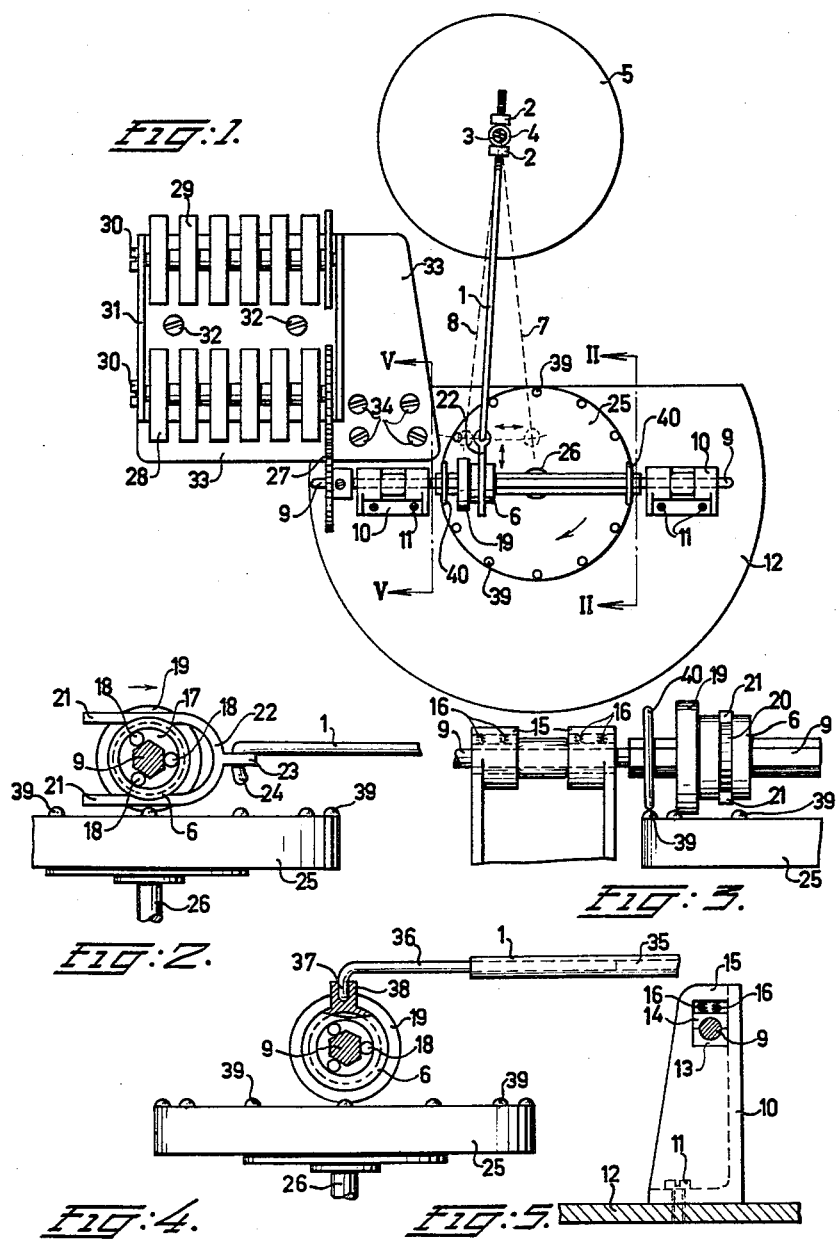

3,110,179
INTEGRATOR TO BE USED IN A CALORIMETER
Pieter Leendert Kooiman, Dordrecht, Netherlands, assignor to Avedko N.V., Dordrecht, Netherlands, a Dutch company
Filed Nov. 20, 1961, Ser. No. 153,545
Claims priority, application Netherlands Nov. 21, 1960
2 Claims. (Cl. 73—193)

This invention relates to new and improved integrators for use with calorimeters for mechanically multiplying in direct proportion to total time, the quantity of a medium flowing per unit of time through a heat exchanger employing a medium which remains in the same state, that is either liquid or gaseous. The quantity of medium flowing is measured by an ordinary meter of the rotating vane type, by either measuring the temperature continuously at one single point in said unit or by measuring the temperature difference measured continuously between two different points in said unit. The measured temperature conditions are instantaneously and continuously converted into varying angular displacements of a rotatable recording pin of the calorimeter.

It is an object of the invention to provide an improved and simplified integrator of the above kind which via an additional and corresponding transmitting means indicates on a totalizer the total quantities of heat consumed or extracted by said heat exchanger which is controlled by means of a calorimeter provided with said improved integrator.

Additional objects and advantages of the invention will be readily apparent from the reading of the following description of a device constructed in accordance with the invention, and reference to the accompanying drawing thereof, wherein:

FIGURE 1 is a plan view of the integrator together with only the totalizer and the recording pin of the related calorimeter (not shown), FIGURE 2 is an enlarged fragmentary side view of a detail taken along the line II—II of FIGURE 1, FIGURE 3 is an enlarged fragmentary front view of another detail of FIGURE 1, FIGURE 4 is a side elevation illustrating a variant of the coupling means between the recording pin and the floating roller, and FIGURE 5 is a fragmentary view, partly in elevation partly in section of the support for the shaft of the totalizer taken along the line V—V of FIGURE 1.

The temperature conditions in the unit (not shown) which is to be controlled are instantaneously and continuously indicated by the position of the recording pin 1 (see FIGURE 1). Said pin 1 is adjustably secured through a shaft 4 by means of two nuts 2 and a stop bolt 3. The shaft 4 rotatably bears in the frame of a symbolically illustrated part 5 of a calorimeter (not shown) in which part the temperature conditions are continuously measured by temperature responsive means for example in the form of a pair of interconnected temperature actuated Bourdon spirals (not shown) to which the shaft 4 is connected. However, obviously the construction of part 5 does not influence the idea underlying the invention which is especially directed to the integrator. Neither does it matter whether the calorimeter has to be used either for a unit which issues a certain amount of medium at one single point of the unit the temperature of the medium being continuously controlled at that point or for a unit through which a medium flows the temperatures at the inlet and the outlet of said unit being continuously controlled as regards the varying difference between them. Further it is not important whether the unit is fed with heat or that heat is withdrawn from said unit.

The free end of the recording pin 1 is connected to a roller 6 in a flexible manner. A flexible coupling described in detail hereinafter, enables the recording pin 1 to swing unhampered between both its end positions shown at 7 and 8 in dotted lines in FIG. 1 and corresponding to the maximum angular displacement which can be expected as a result of varying temperature conditions measured by the calorimeter and converted into angular displacement of said recording pin 1. At the same time the pin 1 undergoes angular displacement the floating roller 6 slides in a rectilinear oscillatory movement on the shaft 9 of a totalizer. The greater part of said shaft 9 is hexagonal (see FIGURE 2) with end pieces of round cross section. By means of said end pieces the shaft 9 is supported by two support brackets 10 arranged diametrically one in front of the other. Said support brackets 10 are securely fixed on a support plate 12 of the integrator frame (not shown) by means of bolts 11 (see FIGURE 5). Each of said brackets 10 has a shape so as to enable the accommodation of two bearings each of which bearings is divided into two equal halves. One of said halves is denoted by 13 and is securely fixed in bracket 10 while the other half is denoted by 14 which is arranged for up and down sliding movement. Two prestressed springs 16 are arranged between the upper surface of half bearing 14 and the inner surface of the top member of said bracket 10, said springs 16 tending to move both halves of said bearing towards one another. Consequently the shaft 9 is rotatably supported and at the same time is resiliently movable in an upward direction in said supports this enabling said shaft 9 to be lifted slightly.

The floating roller 6 sliding on the hexagonal part of said shaft 9 is provided with a cylindrical bore 17 of sufficient diameter to accommodate three small balls 18 inside said bore 17. Each of said balls 18 is inserted alternatively between the inner walls of the bore 17 and three of the six faces of the hexagon. As a result of this coupling the shaft 9 will be rotated by the floating roller 6 as soon as said roller 6 is rotated while at the same time sliding movement of the floating roller 6 on the shaft 9 remains unhampered. The floating roller 6 is provided on one front wall with a flange 19 the diameter of which is greater than that of the body proper of said roller. Said body of the roller is provided with a circular groove 20 (see FIGURE 3). Two legs 21 of a forked sliding member 22 are inserted into said groove 20, said sliding member 24 having an eye 23 in which is inserted the bent free end 24 of the recording pin 1. As a result of an angular displacement of the recording pin 1 due to a variation in the temperature conditions of the unit which is to be controlled, the floating roller 6 will slide on the shaft 9 in one direction or the other depending in which way the temperature conditions are varied.

The shaft 9 of the totalizer is arranged symmetrically and diametrically with respect to the axis of a shaft 26 of a flow meter of the rotating vane type (not shown) arranged under the support plate 12 of the integrator frame and measuring the amount of medium flowing through the unit which is to be controlled. On the top of said shaft 26 is concentrically fixed a flat drive disc 25 of circular shape. The shaft 9 drives by means of a toothed reducing gear 27 a counting mechanism 28 forming part of the totalizer of the calorimeter. In this embodiment said counting mechanism 28 and a counting mechanism 29 the total amount of medium passing the flow meter are united together on one single support member 31 by means of nut bolts 30. Mechanism 29 is entirely conventional and is adapted through means (not shown) for measuring the quantity of fluid flowing through the installation. Said support member 31 is securely fixed by means of nut bolts 32 on a support plate 33 which is secured by means of nut bolts 34 on the support plate 12 of the integrator frame. Since the shaft 9 is supported in bearings 13 and 14 so that it can be slightly lifted, the toothed reducing gear 27 has to be accommodated accordingly.

The floating roller 6 bears on the upper surface of the flat drive disc 25 with sufficient friction to enable said flat drive disc 25 to drive said floating roller 6. The flat drive disc 25 is driven in a revolving movement by means of the rotating shaft 26 of the flow meter as soon as the medium flows through said meter. Consequently the flat drive disc 25 revolves in a direct proportion to the amount of medium flowing through said meter per unit of time. Thus the velocity with which the floating roller 6 rotates as a result of the drive of said revolving flat drive disc 25 depends in a direct proportion on the revolving velocity of said flat disc. Further said rotating velocity of the floating roller 6 depends on the radial position of the flange 19 with respect to the center of the flat drive disc 25 i.e. the axis of the shaft 26 of the flow meter.

Assuming for simplicity's sake that the flat drive disc 25 revolves at a constant speed the rotating velocity of the floating roller 6 will increase in a direct proportion to the increase of the distance of the flange 19 from the center of said disc 25 since the axis of said shaft 9 passes precisely across the said center. When the floating roller 6 rotates, it drives the rotating shaft 9 which operates the counting mechanism 28. Advantageously the point of rotation of the recording pin 1 is situated on the perpendicular line erected in the middle of a straight line covering the distance between the extremities of both end positions 7 and 8 of said recording pin 1.

In a variant of the coupling means between the recording pin 1 and the floating roller 6, said pin 1 has at its free end a longitudinal boring 35. A shaft 36 of a gripping pin engages telescopically within said boring 35 and the free bent end 37 of said gripping pin is accommodated in a recess of a block member 38 securely fixed on said floating roller 6.

The resulting effect is as follows. Due to the position of the shaft 9 of the totalizer with respect to the rotating flat drive disc 25 as well as to the situation of the centre of rotation of the recording pin 1 each of the angular displacements of said recording pin is converted into a fixed acceleration or retardation of the angular movement of the floating roller 6 driven by the flat drive disc 25. Since the floating roller 6 drives the shaft 9 of the totalizer continuously in only one revolving direction each of said angular accelerations or retardations of the floating roller 6 will result in equal accelerations or retardations of said shaft 9. The varying velocities of rotation of shaft 9 are registered by the counting mechanism 28 forming part of the totalizer of the calorimeter. It is obvious that the revolving speed of the rotating flat drive disc 25 is determined by the quantity of the medium passing the flow meter of the unit which is to be controlled while in the manner already described the revolving speed on one hand and on the other hand the angular displacement of the recording pin indicating the instantaneous temperature conditions in the same unit are continuously multiplied, the product thereof being at any time in direct proportion to both said revolving speed and said angular displacement.

To further raise the sensitivity of the integrator, the flat drive disc 25 is provided with an even number of projections 39 of equal length distributed at regular intervals along the peripheral edge of said flat drive disc 25 and arranged at the upper surface of said drive disc 25 which is directed towards the floating roller 6. Advantageously, the shaft 9 is provided at both ends with a lift disc 40 securely fixed on said shaft 9. Each lift disc 40 is positioned so as to correspond with the circular path of the projections 39 passing underneath said lift disc. Consequently for each rotation of the flat drive disc 25 the shaft 9 will be lifted up several times in a fixed periodic arrangement and at each time only for a short period. After each lifting, the shaft 9 is pressed immediately downwards by means of the springs 16 arranged in each of the supporting brackets 10. Together with the shaft 9 the floating roller 6 is released at each time for a short period from the upper surface of the flat drive disc 25. In this way the sliding movement of the floating roller 6 on the shaft 9 is remarkably facilitated as the overall friction between said floating roller 6 and the flat drive disc 25 for each rotation of the latter is diminished remarkably by using said method. Since there are an even number of projections 39 at regular spaced intervals on the disc 25, the interruptions in the contact between the floating roller 6 and the upper surface of the flat drive disc 25 will be strictly regulated so that it is very easy to take these interruptions in account when the whole calorimeter is adjusted in an accurate manner.

The foregoing description of the invention is explanatory only, and changes in the illustrations may be made by those skilled in the art, within the scope of the appended claims, without departing from the spirit of the invention.

What I claim is:

1. An integrator for use with a calorimeter comprising a flat drive disc adapted for being supported on a drive shaft of a flow meter which is able to measure the flow of a medium per unit time through the calorimeter, a totalizer including a shaft directed diametrically across the flat drive disc, a roller slidable on but drivingly coupled to the totalizer shaft, said roller being adapted to bear on the flat drive disc, and an angularly movable recording pin for indicating continuously by the angular movements thereof a temperature condition within the calorimeter, said pin being operatively associated with the roller such that angular movements of the pin will cause proportional sliding movement of the roller, the roller being in contact with the flat drive disc to be driven thereby to rotate at a speed proportional to the amount of medium flowing per unit time and also to the temperature condition represented by the recording pin, said roller transmitting the rotation thereof to the totalizer shaft causing the totalizer to record the product of the amount of medium flowing per unit time and the said temperature condition in a direct proportion to the total time of recording, said roller concentrically encircling the totalizer shaft and having more than one drive engagement with the totalizer shaft, the flat drive disc being provided with an even number of projections spaced at regular intervals around the periphery of said drive disc and directed towards said roller, means supporting the totalizer shaft for resilient movement towards and away from said flat drive disc such that the totalizer shaft is lifted at regular intervals by the projections, whereby the roller is lifted from the drive disc at these regular intervals thus facilitating sliding movement of the roller.

2. An integrator as in claim 1, comprising two lift discs on said totalizer shaft cooperating with the projections for lifting the totalizer shaft as the lift discs contact the projections.

References Cited in the file of this patent

UNITED STATES PATENTS

| 1,204,729 | Arnott | Nov. 14, 1916 |
| 2,109,757 | Stephens | Mar. 1, 1938 |
| 3,073,157 | Gehre | Jan. 15, 1963 |